(12) United States Patent
Virgillitti

(10) Patent No.: US 8,357,236 B1
(45) Date of Patent: Jan. 22, 2013

(54) BOARD WAX AND METHOD OF FABRICATING SAME

(76) Inventor: Robert Virgillitti, Kapaa, HI (US)

( * ) Notice: Subject to any disclaimer, the term of this patent is extended or adjusted under 35 U.S.C. 154(b) by 338 days.

(21) Appl. No.: 12/589,574

(22) Filed: Oct. 26, 2009

Related U.S. Application Data

(60) Provisional application No. 61/197,249, filed on Oct. 24, 2008.

(51) Int. Cl.
*C09D 191/00* (2006.01)
(52) U.S. Cl. .......................................... 106/36; 106/245
(58) Field of Classification Search .............. 106/9, 245, 106/36
See application file for complete search history.

(56) References Cited

U.S. PATENT DOCUMENTS

2009/0013902 A1* 1/2009 Semasko ........................ 106/270
2009/0061012 A1* 3/2009 Drew ............................. 424/520

OTHER PUBLICATIONS

Stewart, Roy, "Eco-Friendly Wax?", Swaylock's Surfboard Design Forum,(Ocotber 2007) see pp. 10-11, downloaded Oct. 1, 2011 http://www2.swaylocks.com/node/1025915?page=1 (Swaylocks).*
"Surfing Technical Data—Wave Equation Surf Products", (Oct. 2007) (WaveEquation).*

* cited by examiner

*Primary Examiner* — David M Brunsman
(74) *Attorney, Agent, or Firm* — Steven M McHugh

(57) ABSTRACT

A board wax and a method for fabricating the board wax is provided wherein the method includes producing melted ivory beeswax by heating a predetermined amount of ivory beeswax to a temperature of about between 120° F. and 140° F., generating a coconut oil mix by mixing a predetermined amount of refined, bleached, de-scented coconut oil with a predetermined amount of naturally scented coconut oil, creating an ivory beeswax coconut oil combination by combining the melted ivory beeswax with the coconut oil mix and mixing the ivory beeswax coconut oil combination until the ivory beeswax coconut oil combination is substantially clear and processing the ivory beeswax coconut oil combination to generate board wax bars having a predetermined size.

16 Claims, 1 Drawing Sheet

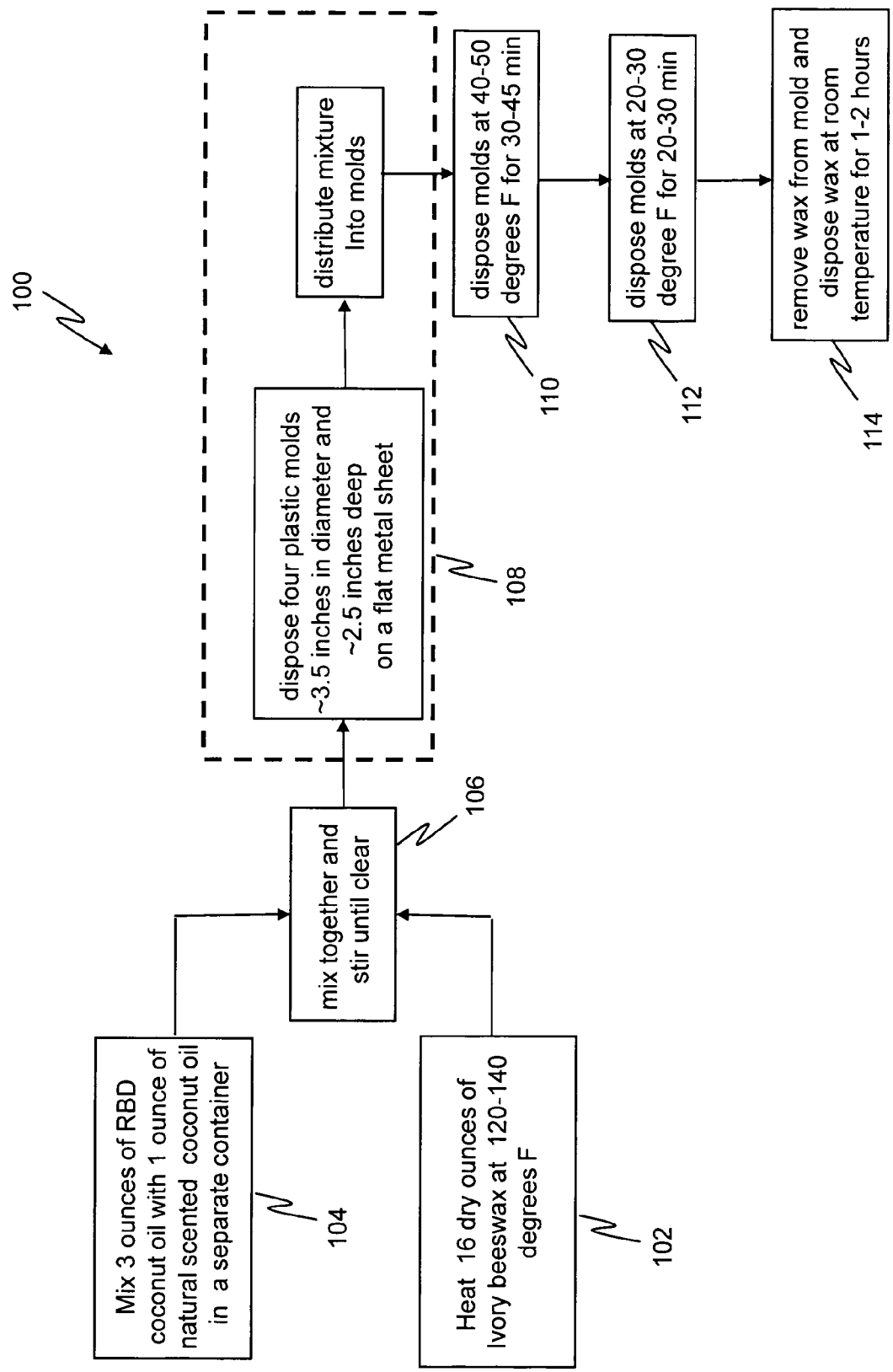

BOARD WAX AND METHOD OF FABRICATING SAME

CROSS REFERENCE TO RELATED APPLICATIONS

This application claims the benefit of and priority to U.S. Provisional Patent Application No. 61/197,249, filed Oct. 24, 2008 and entitled"Board Wax and a Method of Fabricating Same" the contents of which are incorporated herein by reference in its entirety.

FIELD OF THE INVENTION

This invention relates generally to a wax product and more particularly to a wax product for adhesion to athletic boards, a method for producing the wax product and a system for applying the wax to an athletic board.

BACKGROUND OF THE INVENTION

Surfboard wax, or 'surfwax', is well known and is typically formulated from natural and synthetic wax products for application to the deck or surface of a water board, such as a surfboard, wakeboard, bodyboard, skimboard, etc. to provide traction and thus keep the rider from slipping off of the board when paddling out, riding a wave or during any motion of an athletic board. Other applications include the grip portion of a kayak or canoe paddle to increase the grip of the user on the paddle.

Typically, surfboard wax is composed of a mixture of paraffin, beeswax, exotically scented oils, such as for example coconut, hemp and pine resin and petrochemicals to enhance their performance. The surfboard wax is typically applied by initially rubbing the wax onto the desired surface (such as the standing surface of a surfboard) in a side-side and then front-back orientation such that several layers of wax are coating the desired surface. A final coat is then applied using a circular motion.

Unfortunately, however, several disadvantages exist with currently available waxes. One such disadvantage is that because the vast majority of surf waxes available are constructed from harsh and abrasive petrochemicals they tend to cause moderate to severe skin and body rashes when used without protective clothing. As well, these products are harmful to the environment taking years to decompose and releasing harmful chemicals into the water while decomposing thus harming reefs and other aquatic life.

Another such disadvantage is that current surfboard waxes lose their performance characteristics and thus must be periodically removed and reapplied to the surface. Removing the wax can be a time consuming process and typically involves heating the surface (via the sun or hair dryer) to soften the wax and then scraping the entire surface using a scraping device to remove the wax. Alternatively, there are products that may chemically remove old wax. Another such disadvantage involves the temperature range suitable for using the surfboard wax. Typically, surfboard waxes are only suitable for a range of temperatures, outside of which their performance degrades. For example, wax used in water colder than its rating will become hard and does not provide the desired stickiness or traction needed to stay on the surfboard. Conversely, wax used in water warmer than its rating will melt. One current method to overcome this disadvantage is to apply several layers of wax, each layer being of a different temperature rating, to achieve a desired level of firmness and stickiness. This can be expensive and time consuming. In this scenario, the board user must purchase and retain an inventory of the different temperature rated waxes, plus an undercoat (also referred to as a base coat) which provides the temperature rated wax with a suitable surface to adhere to.

Still yet another disadvantage involves the situation where an additional coating of wax must be applied to the board while floating in the ocean several hundred yards off shore. Unfortunately, however, current board wax formulations sink when dropped in water. In order to address this issue, wax 'bars' are typically attached to the rider or board using a rope so that the wax will be retrievable if dropped. This is undesirable because the rope can interfere with the board rider, or at the very least be an uncomfortable attachment.

SUMMARY OF THE INVENTION

A method for fabricating board wax for an athletic board is provided, wherein the method includes producing melted ivory beeswax by heating a predetermined amount of ivory beeswax to a temperature of about between 120° F. and 140° F. The method also includes generating a coconut oil mix by mixing a predetermined amount of refined, bleached (may be non-chemically or naturally bleached), de-scented coconut oil with a predetermined amount of naturally scented coconut oil and creating an ivory beeswax coconut oil combination by combining the melted ivory beeswax with the coconut oil mix and mixing the ivory beeswax coconut oil combination until the ivory beeswax coconut oil combination is substantially clear. The method further includes processing the ivory beeswax coconut oil combination to generate board wax bars having a predetermined size, volume and/or weight.

A board wax is also provided, where the board wax in made from a plurality of raw materials that include, ivory beeswax, refined, bleached (may be non-chemically or naturally bleached), de-scented coconut oil and natural scented coconut oil. The board wax is formed by processing the plurality of raw materials via a predetermined method, wherein prior to processing, the plurality of raw materials is made up of about 81.3% by weight of the ivory beeswax, about 4.68% by weight of the natural scented coconut oil and about 14.02% by weight of the refined, bleached, de-scented coconut oil.

Furthermore, a board wax is provided, where the board wax is made from a plurality of raw materials, wherein the plurality of raw materials includes, ivory beeswax, refined, bleached (may be non-chemically or naturally bleached), de-scented coconut oil and natural scented coconut oil, wherein the plurality of raw materials is processed via a predetermined method to generate the board wax such that board wax is represented by the following formula, $$C_{15}H_{31}CO_2C_{30}H_{61}CH_3(CH_2)_{10}COOH.$$

BRIEF DESCRIPTION OF THE DRAWINGS

The foregoing and other features and advantages of the present invention will be more fully understood from the following detailed description of illustrative embodiments, taken in conjunction with the accompanying drawings in which like elements are numbered alike:

FIG. 1 is a block diagram illustrating a method for formulating the board wax in accordance with the present invention.

DETAILED DESCRIPTION

As disclosed herein with regards to an exemplary embodiment, a board wax is disclosed which is designed for use in all ranges of water temperatures without harming the user or the environment. The board wax is organic and 100% biodegradable and does not melt off the board in the sun like other waxes. It lasts longer without rubbing off and maintains high rates of performance longer than traditional waxes. Furthermore, the board wax floats in water so it is not as easily lost into the environment as typical waxes sink due to their high specific gravity. The board wax is capable of being scented with a variety of different fragrances. The unique properties of the board wax is at least in part the result of processing which creates a 'cross bonding' event, thus allowing for a formulation of a polymeric superstructure. It should be appreciated that although the invention is discussed herein as using ivory beeswax, any type of beeswax suitable to the desired end purpose may be used. Also, it is contemplated that the beeswax may be raw beeswax or it may be filtered (or otherwise processed) to remove pollen and/or other impurities to alter the natural beeswax to the ivory or white stage.

It should be appreciated that although the method described hereinafter includes volumes and weights of materials, larger and/or smaller volumes and weights may be used. Referring to FIG. 1, a block diagram illustrating one embodiment of a method 100 for formulating the board wax in accordance with the present invention is shown and includes heating 16 dry ounces of ivory beeswax at approximately 120-140 degrees Fahrenheit (F.) in a non-stick container, as shown in operational block 102. Additionally, 3 ounces of refined, bleached (may or may not be non-chemically or naturally bleached), de-scented (RBD) coconut oil is mixed with 1 ounce of natural scented coconut oil in a separate plastic (or other suitable material) container, as shown in operational block 104. The melted beeswax is then combined with the de-scented and scented coconut oil mixture and stirred until the combination is substantially clear, as shown in operational block 106. This should yield approximately 24 fluid ounces. The beeswax-coconut oil combination is poured into four circular plastic molds approximately 3.5 inches in diameter and approximately 2.5 inches deep, as shown in operational block 108. It is contemplated that the molds may be located on a flat metal sheet to help with the creation of the wax. Accordingly, each mold should contain approximately 6 fluid ounces and will yield approximately four 5 dry ounce wax bars.

The metal sheets with the molds are then placed in a refrigerated area at approximately 40-50 degrees Fahrenheit (F.) for approximately 30-45 minutes, as shown in operational block 110. The metal sheets are then disposed in a freezer at approximately 20-30 degrees Fahrenheit (F.) for approximately 20-30 minutes, as shown in operational block 112. The wax bars are then removed from the molds and disposed at approximately room temperature (between about 68 Fahrenheit (F) to about 77 degrees Fahrenheit (F.)) for approximately 1-2 hours, as shown in operational block 114.

In accordance with one embodiment of the present invention, the board wax can be described by the formula:

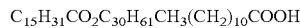

$$C_{15}H_{31}CO_2C_{30}H_{61}CH_3(CH_2)_{10}COOH$$

It should be appreciated that, as is well-known, the dry weight of 1 fluid ounce of coconut oil is about 0.92 ounces. Accordingly, prior to combining the ivory beeswax, the refined, bleached, de-scented coconut oil and the natural scented coconut oil, the beeswax should account for about 81.3% by weight of preprocessed materials, the natural scented coconut oil should account for about 4.68% by weight of the preprocessed materials and the refined, bleached, de-scented coconut oil should account for about 14.02% by weight of the preprocessed materials. It is contemplated that It should be appreciated that the mixing, heating and cooling time ranges described hereinabove may vary by ±10% depending upon the desired end result, such as performance, texture and/or scent. Moreover, other oils and/or waxes, both scented and/or unscented may be used as desired depending upon the desired end result, such as performance, texture and/or scent. It should also be appreciated that the invention allows for a board wax that retains desirable characteristics and performance attributes across water of all temperature ranges, unlike current waxes that suffer performance degradation and therefore must have multiple versions or variations in materials and/or processes to satisfy the user in all water temperatures.

While the invention has been described with reference to an exemplary embodiment, it will be understood by those skilled in the art that various changes, omissions and/or additions may be made and equivalents may be substituted for elements thereof without departing from the spirit and scope of the invention. In addition, many modifications may be made to adapt a particular situation or material to the teachings of the invention without departing from the scope thereof. Therefore, it is intended that the invention not be limited to the particular embodiment disclosed as the best mode contemplated for carrying out this invention, but that the invention will include all embodiments falling within the scope of the appended claims. Moreover, unless specifically stated any use of the terms first, second, etc. do not denote any order or importance, but rather the terms first, second, etc. are used to distinguish one element from another.

What is claimed is:

1. A method for fabricating board wax for an athletic board, the method comprising:
   producing melted beeswax by heating beeswax to a temperature of about between 120° F. and 140° F.;
   generating a coconut oil mix by mixing refined, bleached, de-scented coconut oil with naturally scented coconut oil;
   creating an beeswax coconut oil combination by combining said melted beeswax with said coconut oil mix and mixing said beeswax coconut oil combination until said beeswax coconut oil combination is substantially clear; and
   processing said beeswax coconut oil combination to generate board wax bars.

2. The method of claim 1, wherein said mixing said beeswax coconut oil combination includes stirring said beeswax coconut oil combination.

3. The method of claim 1, wherein said processing includes,
   disposing a portion of said beeswax coconut oil combination into at least one molding device.

4. The method of claim 3, wherein said molding device is a plastic molding device about 3.5 inches in diameter, about 2.5 inches in depth and contains about 6 fluid ounces of said beeswax coconut oil combination.

5. The method of claim 4, wherein processing said 6 fluid ounces of said beeswax coconut oil combination results in a wax bar that has a dry weight of about 5 ounces.

6. The method of claim 3, wherein processing further includes locating said at least one molding device on a substantially flat metal surface.

7. The method of claim 3, wherein said processing further includes locating said molding device in an area having a temperature range of about 40° F. to 50° F. for a time frame of about 30 minutes to 45 minutes to generate a cooled molding device.

8. The method of claim 7, wherein said processing further includes locating said cooled molding device in an area having a temperature range of about 20° F. to 30° F. for a time frame of about 20 minutes to 30 minutes to generate a further cooled molding device.

9. The method of claim 8, wherein said processing further includes locating said further cooled molding device in an area having a temperature range of about room temperature for a time frame of about 60 minutes to 120 minutes.

10. A board wax, the board wax comprising:
a plurality of raw materials, wherein said plurality of raw materials include, beeswax;
refined, bleached, de-scented coconut oil; and
natural scented coconut oil,
wherein the board wax is formed by processing said plurality of raw materials according to the method of claim 1, wherein prior to processing, said plurality of raw materials is made up of about 81.3% by weight of said beeswax, about 4.68% by weight of said natural scented coconut oil and about 14.02% by weight of said refined, bleached, de-scented coconut oil.

11. The board wax of claim 10, wherein the board wax floats when disposed in water.

12. A board wax, the board wax comprising:
a plurality of raw materials, wherein said plurality of raw materials includes,
beeswax;
refined, bleached, de-scented coconut oil; and
natural scented coconut oil,
wherein said plurality of raw materials is processed according to the method of claim 1 to generate the board wax such that board wax is represented by the following formula, $$C_{15}H_{31}CO_2C_{30}H_{61}CH_3(CH_2)_{10}COOH.$$

13. The board wax of claim 12, wherein the board wax floats when disposed in water.

14. The board wax of claim 12, wherein said beeswax includes ivory beeswax.

15. The board wax of claim 10, wherein said beeswax includes ivory beeswax.

16. The board wax made by the process of claim 1, wherein said beeswax includes ivory beeswax.

* * * * *